United States Patent [19]

Bömers et al.

[11] 4,373,981
[45] Feb. 15, 1983

[54] PROCESS FOR THE MANUFACTURE OF OBJECTS FROM WATER-HARDENED MATERIAL

[75] Inventors: Joseph J. P. Bömers, Weert, Netherlands; David G. Ellis, Leeds, England; Johann J. Jansen, Nieuwstadt; Jan M. J. M. Bijen, Munstergeleen, both of Netherlands

[73] Assignee: Plasticisers, Ltd., Drighlington, England

[21] Appl. No.: 217,681

[22] Filed: Dec. 18, 1980

[30] Foreign Application Priority Data

Dec. 22, 1979 [NL] Netherlands ............ 7909298

[51] Int. Cl.³ ............................................. B32B 31/00
[52] U.S. Cl. .................................. 156/164; 156/204; 156/229; 156/290; 156/324; 264/333; 264/DIG. 47; 428/247; 428/703
[58] Field of Search ............... 264/258, 333, DIG. 47, 264/174; 428/105, 121, 192, 247, 703; 156/204, 39, 73.5, 40, 164, 229, 290, 324

[56] References Cited

U.S. PATENT DOCUMENTS

| | | | |
|---|---|---|---|
| 3,523,059 | 8/1970 | Coates | 418/293 |
| 3,615,996 | 10/1971 | Hasegawa et al. | 156/164 |
| 3,682,734 | 8/1972 | Burger | 156/148 |
| 3,810,800 | 5/1974 | Doll | 156/227 |
| 3,879,820 | 4/1975 | Grieves | 19/163 |
| 3,985,599 | 10/1976 | Lepoutre | 428/137 |
| 4,242,407 | 12/1980 | Byen | 428/247 |
| 4,267,136 | 5/1981 | Byen | 428/255 |
| 4,297,409 | 10/1981 | Hannoht | 428/247 |

FOREIGN PATENT DOCUMENTS 2202306 8/1973 Fed. Rep. of Germany .

Primary Examiner—James J. Bell

[57] ABSTRACT

The invention relates to a process for the manufacture of objects from water-hardened materials, reinforced with one or more reticulate webs, one over the other, which webs have been obtained by stretching, fibrillating and spreading of a film of organic polymeric material, by continuously supplying one or more reticulate webs, contacting them with a water-hardening material and water, thus forming a composite material, and shaping and hardening this material. This is obtained according the invention in that:

a. one or more reticulate webs, one on top of the other, are continuously supplied and laid on a carrier;
b. the reticulate webs are folded zig-zag on this carrier;
c. the folded network is continuously transported in a direction virtually normal to the direction in which the reticulate webs are supplied;
d. subsequently, the folded network is contacted, directly or indirectly, with a water-hardening material and water.

The rate of supply of the reticulate webs to be folded and the rate of discharge of the folded networks is such that the angle between two successive folded sides of the reticulate webs is between ½° and 120°, in particular between 50° and 90° and most in particular between 1° and 20°.

Reticulate webs are applied to one side or to both sides of the resulting folded network, which webs have been stretched and fibrillated longitudinally and in the transport direction and are supplied in the direction of motion of the folded network, and in particularly, at only one of the two sides of the resultant folded network, reticulate webs stretched in the transport direction are applied, and at the other side only one or two of such webs.

The resulting folded network packages are integrated to a whole by welds at the sides and passed between two rollers prior to being contacted with a water-hardening material.

12 Claims, 2 Drawing Figures

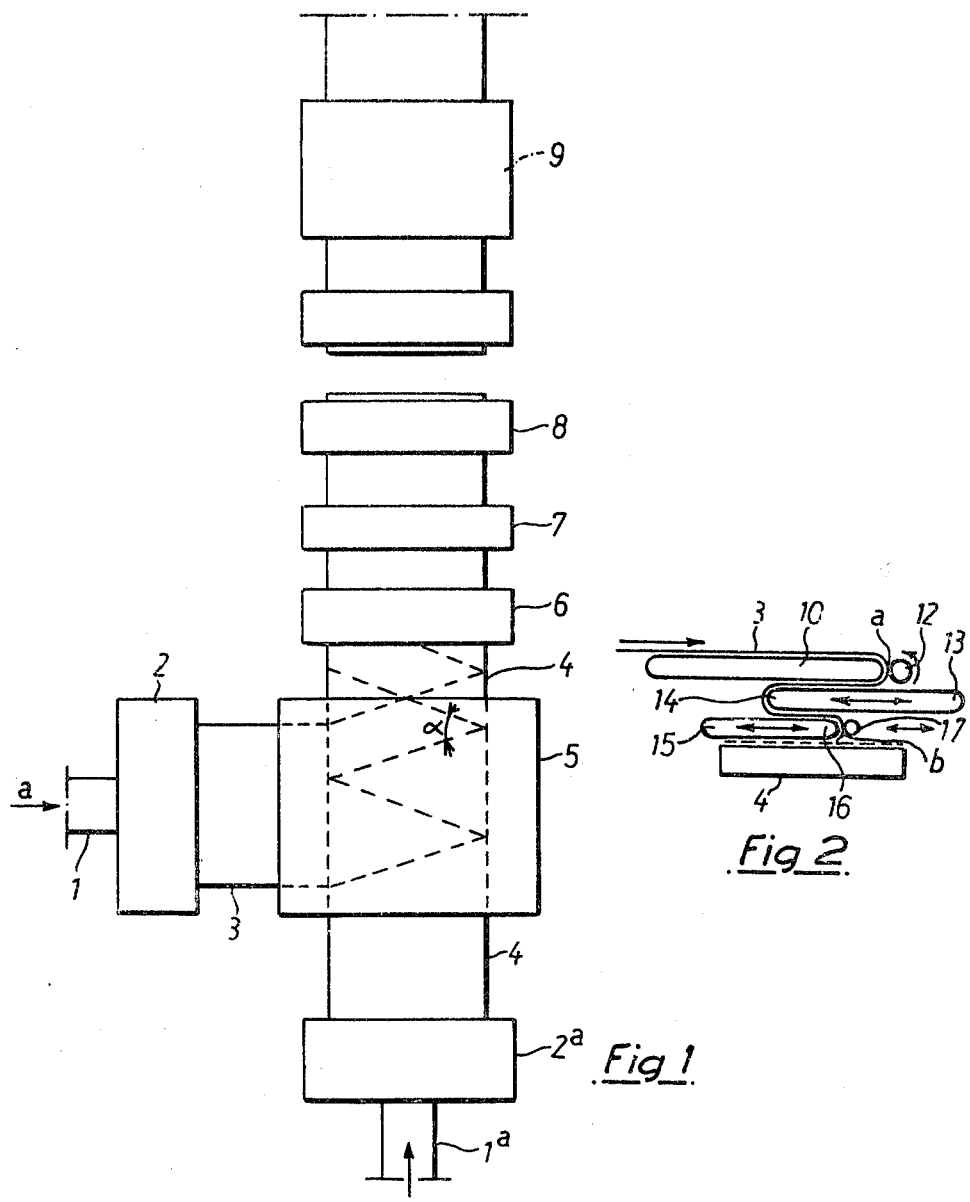

PROCESS FOR THE MANUFACTURE OF OBJECTS FROM WATER-HARDENED MATERIAL

The invention relates to a process for the manufacture of objects from water-hardened materials, reinforced with one or more reticulate webs, one on top of the other, which webs have been obtained by stretching, fibrillating and spreading of a film of organic polymeric material, by continuously supplying one or more reticulate webs, contacting them with a water-hardening material and water, thus forming a composite material, and shaping and hardening this material.

In the U.S. Pat. No. 4,242,407 a method has been proposed for the continuous application of reticulate webs as reinforcement in water-hardening material. In this patent application it was already recognized that the products obtained show considerable deviations in strength in different directions. For elimination of this drawback, two methods are proposed in said patent application, namely applying of several reticulate webs disposed angularly relative to each other, and applying of reticulate webs which have been stretched at different angles, fibrillated and spread. However, these proposed methods have the drawback of requiring additional equipment, which is of such complicated and special nature as to make implementation of those proposals unattractive. In said Netherlands patent application it has also been suggested that reinforced water-hardening material could be manufactured with one reticulate web folded zig-zag, instead of with several reticulate webs. The drawback mentioned is the complicated equipment required for this method and the inferior strength properties of the products obtained.

The inferior strength of the products obtained by this method is due to the zig-zag folding in the transport direction of the continuously fed reticulate web by subjecting it to a reciprocating motion. In this way, several layers are formed, but these layers show rather many discontinuities, so that the fibres of the reticulate webs cannot sufficiently transmit the stresses because they are not continuous.

It has now been found that by applying a special manner of zig-zag folding of the reticulate webs it is not only possible to eliminate the drawback of inferior strength properties, but moreover to achieve a considerable improvement of the strength ratios in the various directions.

The purpose of the invention is to provide a method for the manufacture of objects from water-hardened materials, reinforced with one or more reticulate webs, one on top of the other, which have been obtained by stretching, fibrillating and spreading of a film of organic polymeric material, by continuously supplying one or more reticulate webs, contacting them with water-hardening material and water to form a composite material, and shaping and hardening this material, which method does not result in products with inferior mechanical properties, but to the contrary gives a considerable improvement as regards the strength ratios in the various directions.

According to the invention, this is achieved in that:
(a) one or more reticulate webs, one on top of the other, are continuously supplied and laid on a carrier;
(b) the reticulate webs are folded zig-zag on this carrier;
(c) the folded reticulate webs are continuously transported in a direction virtually normal to the direction in which the web is supplied;
(d) subsequently, the network package is contacted, directly or indirectly, with a water-hardening material and water.

Water-hardening materials are understood to be materials which will harden through their binding with water. Examples of such materials are: Portland cement, blast-furnace cement, aluminium cement, gypsum, fly ash.

The reticulate web need not necessarily be supplied forthwith to the installation in which it is contacted with the water-hardening material. The folded reticulate web may also be stored or transported to be used for the manufacture of objects from water-bonded materials at another place or at a later point in time.

In the present invention, the high uniform strength in the longitudinal direction of reticulate webs may be converted, due to the special manner of folding, into strength in any desired direction or even into uniform strength in all directions.

A reticulate web of fibrillated plastic film is preferably prepared by extruding a plastic to form a film with a thickness of between 10 and 1000 microns, in particular 50 to 500 microns, which film may then be cut into strips, stretching it to for instance 10 times the original size, resulting in a thickness of preferably between 50 and 150 microns, which brings the material into a state of imminent fibrillation, and next passing it over a pin roll, brush or comb or subjecting it to shearing forces by means of rollers or air streams. The fibrillation may also be effected by twisting. Subsequently, the stretched and fibrillated film is spread to form a network. A continuous web of such a network may be rolled into a coil or may be fed directly from the extruder, in which case the extruded film is stretched and fibrillated on its way from the extruder mouth to the point where it is contacted with the water-hardening material.

The term 'continuous' also refers to the use of a certain length of such a reticulate web, fed for instance from a coil, which length is in any case many times larger than the size of the product ultimately formed. The reticulate web applied according to the invention thus consists of continuous fibers. This means that the elements of which the network is made up, such as fibers, extend virtually throughout the end-product.

By 'spreading of the stretched and fibrillated film' is meant enlarging of the dimensions in a direction practically normal to the stretching direction. Preferably, the widening is by a factor of at least 4, for instance 6 or 12. If tubular film is used, this spreading can be done-as described in the non-prepublished British patent application No. 41478-by drawing the fibrillated film over a conical mandrel. Another method, which is also applicable to flat film and to pack of films, one on top of the other, consists in lateral spreading by means of clamping rollers; this has been described in the non-prepublished Dutch patent application No. 7905782.

In the spreading process, the longitudinal or transverse dimension is enlarged. The fibrillated film is thus made into a network with meshes formed by coherent fibrils and filaments. The reticulate webs are preferably dimensionally stabilized after having been spread, for instance by heating and/or spraying with a resin-like material. This spraying gives the additional advantage of preventing the reticulate webs superimposed one upon the other being displaced relatively to each other during processing in an installation for manufacture of reinforced products.

The carrier onto which the reticulate webs are laid and on which they are folded may be a driven conveyor belt, but also, for instance, a table with detached rollers for continuous discharge of the folded network package.

The rate of supply of the reticulate webs to be folded and the rate of discharge of the folded reticulate webs is chosen so that the angle between successive sides of the reticulate webs may be between ½° and 120°. This angle is called the overlap angle.

Preferably the reticulate webs are laid zig-zag on the carrier with an 'overlap' angle of between 20° and 100° and in particular between 50° and 90°. In this manner, the uniformity of the strengths in the various directions is considerably improved. In these overlap angles, preferably several of these folded layers, at least two, on top of each other will be applied. Another possibility, which is the most favorite, is to choose an overlap angle of 1° to 50°, more in particular 1° to 20°, it being highly preferable then for one or more additional reticulate webs, stretched longitudinally or in the transport direction, to be supplied in the direction of motion of the folded network package.

The overlap angle can be adjusted by varying the ratio of the rate of supply of the unfolded web to the rate of discharge of the folded network packages. If the width of the unfolded web is equal to the width of the discharged folded network, then the greatest practicable overlap angle is about 53°. However, there may be a great difference in width between the supplied and the discharged reticulate webs. This is one of the factors on which the overlap angle depends. This means that with the maximum practicable overlap angle, the tangent of half the angle is equal to half to ratio of the width of the supplied web to the width of the discharged folded web.

A network package is preferably made up as follows: at one of the two sides of the folded network, continuous reticulate webs stretched in the transport direction are applied and at the other side only one or two of such reticulate webs, after which the whole is combined. In this way little or no irregularities are obtained and it appears that the network package handles and works up well.

The folding can be simplified by directing small air flows internally at the folding lines, in such a manner that these folding lines are pushed in a direction opposite to the folded reticulate webs. This causes the pressure forces on the reticulate webs along the folding lines during the folding to be converted into tensile forces, so that irregularities along the folding lines, such as wrinkles, are prevented.

The folded network packages, which may have further folded reticulate webs added to them, are preferably integrated into one whole by welding the edges together, for instance by ultrasonic or thermal methods, which facilitates handling and later application in water-hardened, reinforced materials. For better handling, the webs of the package may also be welded together at other places for instance in the middle. It is advantageous to compact the network package, for instance by passing it between rollers. The network package is thus also levelled. One or more of the rollers, may be heated, for instance to 75°–125° C.

Together with the folded reticulate webs one or more continuous film webs, which may be perforated, may be carried off in the direction of transport of the folded reticulate webs and joined with these. It is also possible instead of or in addition to these films, to join a set of wires or networks such as woven, knitted or extruded networks with the folded reticulate webs.

The network packages manufactured by the above methods are incorporated into the water-hardening material by continuously supplying one or more network packages and bringing them into contact with water-hardening material and water.

The products manufactured according to the invention reinforced with the network packages have better properties, in particular as regards isotropy, due to the special manner of zig-zag folding. Moreover, the required equipment is relatively uncomplicated.

In a special mode of implementation of the method according to the invention, a network package is supplied and contacted with water-hardening material and water, while on another carrier a second network package is supplied and contacted with water-hardening material and water, after which the second package is turned on a reversing roller and placed on the first package. The choice of the kind of network package to be used depends on the required strength properties of the ultimate end-product.

The plastic used for the preparation of the fibrillated films may be a polyolefine, but also film-forming and fiber-forming thermoplastics are suitable, such as polymers of styrene, acrylonitrile or vinyl chloride and copolymers thereof. In particular, partially crystalline polymers are used, such as polyamides and polyesters. Special preference is given to polyolefines, modified or non-modified. Most preference is given to ethylene or propylene homopolymers, although copolymers and block copolymers may also be used. As a matter of course, mixtures of polymers may also be used.

To the polymers, all kind of filler and auxiliary materials may be added, such as carbon black, polar compounds pigments, light and heat stabilizing agents and anti-oxidizing agents. It is of great importance to add the correct stabilization agents to the networks. Favorable results may be achieved with a combination of a metal de-activator and an anti-oxidant. The compounds are used in quantities of 0.001 to 2.5% by wt., in particular 0.01 to 1% by wt.

It has been found that the number of holes in the networks used may greatly affect the ultimate strength properties of the objects manufactured. The number of holes in the networks preferably is over 2 per $cm^2$. The number of holes in the network package is preferably more than 100 per $cm^3$ fabricated reinforced layer.

The invention will now be elucidated with reference to a drawing, in which

FIG. 1 is a diagrammatic top view of the equipment used for manufacturing network packages applied as reinforcement in water-hardening materials; and FIG. 2 is an elevation of the folding unit from FIG. 1 for the reticulate webs, viewed normal to the direction of transport of the folded network.

As appears from FIG. 1, one layer or several layers, one upon the other, of stretched and fibrillated film which has not been laterally spread is supplied, in the direction indicated by arrow a, to a spreading and stabilization unit 2. After having been laterally spread and then stabilized at the resultant width, network 3 is supplied to a folding unit 5 arranged over carrier 4. This carrier may be a belt conveyor or a table provided at the discharge end with driven rollers which continuously discharge the folded network. Unit 5 deposits the reticulate webs 3 on carrier 4 and folds them on it, with a continuous reciprocating motion at right angles to carrier 4.

As the network is continuously discharged, it is folded to a zig-zag, the zig-zag angle being dependent upon the rate at which the reticulate webs are supplied to the folding device and the rate at which the folded network is discharged on carrier 4. In other words, the overlap angle α, i.e. the angle between two successive sides of the folded reticulate web, is determined by these factors. One or more further reticulate webs may be added to the folded network, longitudinally in relation to the folded network. As the drawing shows, a supply unit for non-spread, stretched and fibrillated film 1a is arranged before the supply end of carrier 4. This film is spread to the desired width and stabilized at this width in spreading and stabilization unit 2a, to be subsequently supplied longitudinally in relation to carrier 4, so as to be integrated with the folded network obtained. These additinal reticulate webs may be applied to one or to both sides on the folded network package. The folded network package, with or without additional reticulate webs, is welded at the sides by means of a welding unit. Welding may be by an ultrasonic or by a thermal method. To further facilitate handling, welding unit 6 may weld the package additionally along the center line. After welding unit 6 heated rollers 7 are installed between which the network package is passed for compacting and levelling it. The network package leaving rollers 7 can be coiled onto a reel 8. The coiled network can be supplied direct to a unit 9 where it is contacted with a water-hardening material and water, so as to form a composite material which is then shaped and hardened.

FIG. 2 shows an elevation of the folding unit 5 of FIG. 1, as viewed in the direction normal to that in which the folded network is discharged. The network 3-consisting of one or several webs-leaving the spreading and stabilization unit 2, is supplied by a transport unit 10 in the direction normal to that in which the folded network is discharged.

At the end 11 of transport unit 10 network 3 is passed on, with the aid of a guide 12, to a transport unit 13 reciprocating in the direction normal to carrier 4, and at the end 14 of this unit 13 it is passed on to a transport unit 15, likewise reciprocating in the direction normal to carrier 4, which unit 15 takes the network 3 to its end 16. At the end 16 there is a guide roller 17 which deposits the network 3 onto carrier 4. This roller 17 likewise reciprocates, synchronously with transport unit 15 and guide roller 17 in the direction normal to carrier 4, network 3 is deposited on carrier 4 in the folded condition. As this carrier 4 may be, for instance, a continuously running belt conveyor, network 3 is folded zig-zag on the carrier 4. As remarked before, the overlap angle α between the successive sides of the folded network 3 is determined by the rate at which the folded network is supplied to the folding unit and the rate at which the folded network is discharged from carrier 4. As the reciprocating motion of transport unit 13 is opposed to that of transport unit 15 with guide roller 17, the length of network 3 between point a, where the network leaves transport unit 10, and point b, where it is deposited on carrier 4, remains constant. This is essential, as otherwise the network would be too taut at one moment and too slack at another moment, resulting in the chance of the network being folded non-uniformly.

Transport unit 13 and transport unit 15 with guide roller 17 always keep network 3 tightly stretched.

In addition, owing to the reciprocating motion of transport unit 15 with guide roller 17, the distance between discharge point b of the network and carrier 4 will remain constant during deposition of network 3 on carrier 4.

EXAMPLE 1

Two stretched and fibrillated polypropylene films, each with a thickness of 35 microns and a modulus of 15,000 N/mm$^2$ at a stretching ratio of 0.1% and a stretching rate of 5% per minute are laid one on top of the other and welded together at the sides. This composite film was spread so that the width increased from 8 cm to 90 cm. At this width he network was stabilized by application of heat at a temperature of 150° C.

The network was next folded zig-zag with an overlap angle of 19°. To this end the stabilized network was supplied at a rate of 60 m/min. The folded network was discharged at a rate of 10 m/min. in a direction normal to the direction of supply. Together with the folded network 10, stretched, fibrillated and spread reticulate webs made of the above said composite film were carried off in a longitudinal direction at one side of the folded reticulate webs.

The resulting network package consisted of 27 layers on average. The sides of the network package were welded. The network package was then passed between heated rollers (100° C.), and next coiled and stored. Later, the stored coils of network package were unrolled and contacted on a carrier with a water-hardening material and water. The water-hardening material used was a mixture of Portland cement, sand and water. After extraction of excess water, the WCF was 0.25 and the sand-cement weight ratio was 0.2:1; the average particle size of the sand was between 200 and 500 microns. Subsequently dewatering was effected. On another carrier another network package was supplied and contacted with a water-hardening material and water, and subsequently dewatered, after which the package on the second carrier was passed over a reversing roller and deposited on the first package. The whole was compressed to a thickness of 6 mm. After compression and cutting to the desired dimensions, hardening took place.

After 28 days' hardening at room temperature and at an RH of 95% the following values were determined:

tensile strength, longitudinal    15 N/mm$^2$
bending strength, longitudinal    24 N/mm$^2$
tensile strength, transverse    15 N/mm$^2$
bending strength, transverse    17 N/mm$^2$ Through adjustment of the overlap angle and, where necessary, use of unfolded reticulate webs, supplied longitudinally and carried off together with the folded networks, it is possible to vary the ratio between the longitudinal and the transverse tensile strength as well as bending strength.

EXAMPLE 2

A stretched and fibrillated polypropylene film with a thickness of 50 μm and a modulus of 15,000 N/mm$^2$ at a stretching ratio of 0.1% and a stretching rate of 5% per minute was spread from a width of 15 to 90 cm. At this width the network was stabilized by means of heat at a temperature of 170° C. Next, the network was folded zig-zag with an overlap angle of 11°30'. For this purpose the stabilized network was supplied at a rate of 60 m/min. and then folded on top of a layer of 7 networks, each with a thickness of 50 μm and a spreading ratio of 1 to 6. The folded network and the added layer of reticulate webs were discharged at a rate of practically 6 m/min. in a direction normal to the direction of supply of the networks to be folded. Simultaneously one stretched, fibrillated and spread reticulate web was discharged along at the top side. The resultant network package was then passed between heated rollers (100° C.), coiled and stored.

Later, the stored coils of network package were unrolled and contacted on a carrier with a water-hardening material and water. The water-hardening material used was a mixture of Portland cement, sand and water. After extraction of excess water, the WCF was 0.25 and the sand-cement weight ratio was 0.2:1; the average particle size of the sand was between 200 and 500 microns. Subsequently dewatering was effected. On another carrier another network package was supplied and contacted with a water-hardening material and water, and subsequently dewatered, after which the package on the second carrier was passed over a reversing roller and deposited on the first package. The whole was compressed to a thickness of 6 mm. After compression and cutting to the desired dimensions, hardening took place.

After 28 days' hardening at room temperature and at an RH of 95% the following values were determined:
tensile strength, longitudinal    20 N/mm²
bending strength, longitudinal    24 N/mm²
tensile strength, transverse    16 N/mm²
bending strenth, transverse    17 N/mm²

Through adjustment of the overlap angle and, where necessary, use of unfolded reticulate webs, supplied longitudinally and carried off together with the folded networks, it is possible to vary the ratio between the longitudinal and the transverse tensile strength as well as bending strength.

We claim:

1. In a process for the manufacture of objects from water-hardened materials, reinforced with at least one reticulate web which has been formed by stretching, fibrillating, and spreading an organic polymeric material, said process including the steps of continuously supplying said at least one reticulate web into contact with a water-hardenable material and water, and shaping and hardening the resulting composite material to form said object, the improvement comprising:
continuously supplying said at least one reticulate web to a moving carrier from a direction virtually normal to the direction of travel of said carrier;
folding said at least one reticulate web in a zig-zag manner to form a folded network on said carrier;
adjusting the rate of supply of said at least one reticulate web to be folded and the rate of travel of said carrier such that the angle between two successive folded sides of said at least one reticulate web so folded is between $\frac{1}{2}$° and 120°; and
subsequently contacting said folded network with a water-hardening material and water.

2. The process of claim 1 wherein a plurality of reticulate webs, one over the other, are supplied to said carrier and folded to form said folded network.

3. The process of claim 1 wherein the angle between two successive folded sides of the reticulate webs is between 20° and 100°.

4. The process of claim 3 wherein the angle between two successive folded sides is between 50° and 90°.

5. The process of claim 3 or 4 wherein a plurality of these folded networks are laid one upon the other.

6. The process of claim 1 wherein the angle between two successive folded sides is between 1° and 50°.

7. The process of claim 6 wherein the angle between two successive folded sides is between 1° and 20°.

8. The process of claim 6 wherein at least one additional reticulate web is applied to at least one side of the resulting folded network, which additional web has been stretched and fibrillated longitudinally in the direction of transport, and which is supplied in the direction of travel of said carrier and folded network to form a network package.

9. The process of claim 8 wherein at both sides of the resultant folded network, reticulate webs stretched in the transport direction are applied to form a network package.

10. The process of claim 8 or 9 wherein the resulting folded network packages are integrated to a whole by welds at the sides.

11. The process of claim 8 or 9 wherein the resulting folded network packages are passed between two rollers prior to being contacted with a water-hardening material.

12. The process of claim 11 wherein one or more rollers are heated.

* * * * *